3,192,155
SYSTEM AND METHOD FOR THE RECTIFICATION
AND CLARIFICATION OF WASTE WATER
John W. Bready and William M. Bready, both of
5318 W. Washington Blvd., Milwaukee, Wis.
Filed Mar. 23, 1959, Ser. No. 801,333
20 Claims. (Cl. 210—44)

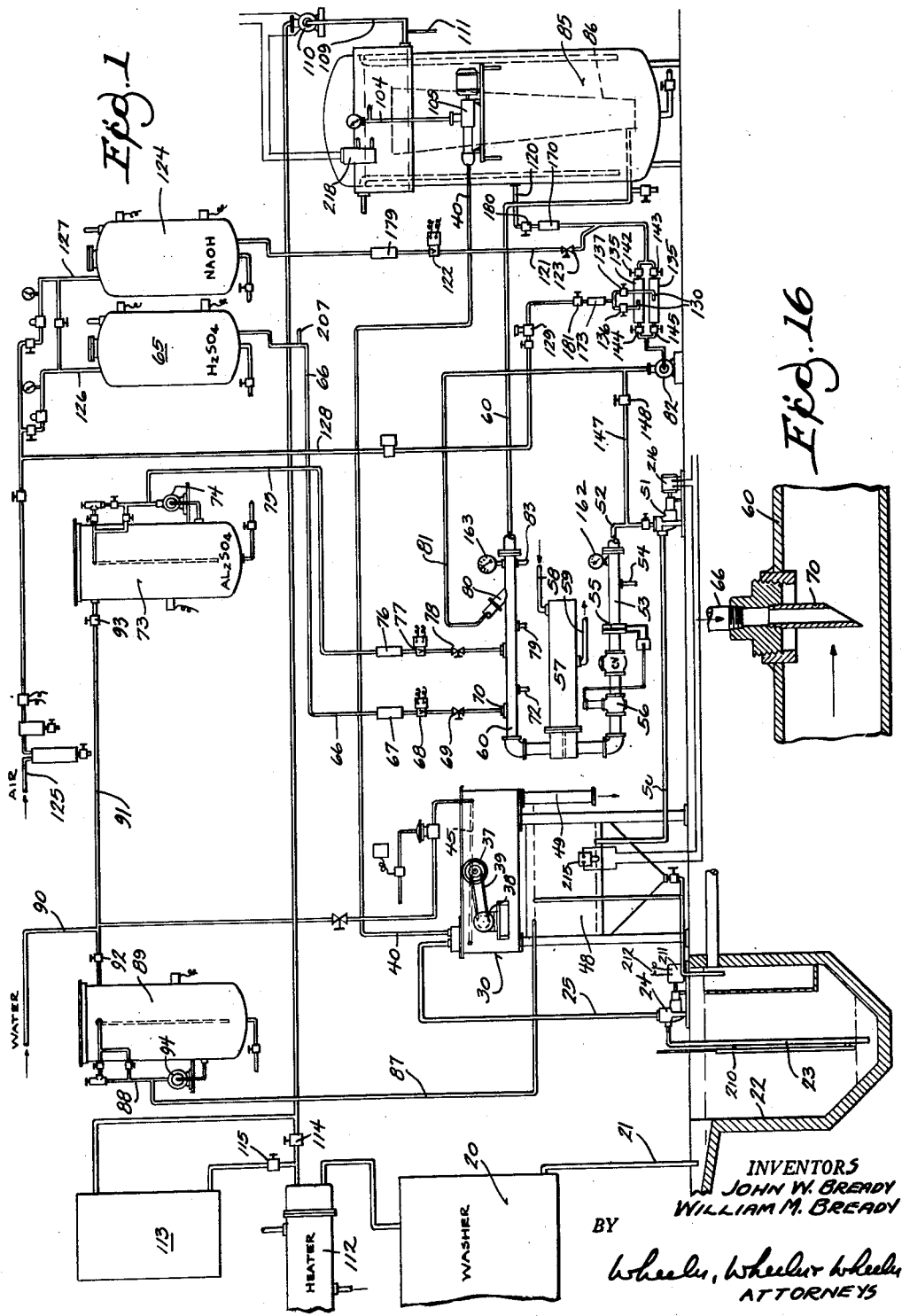

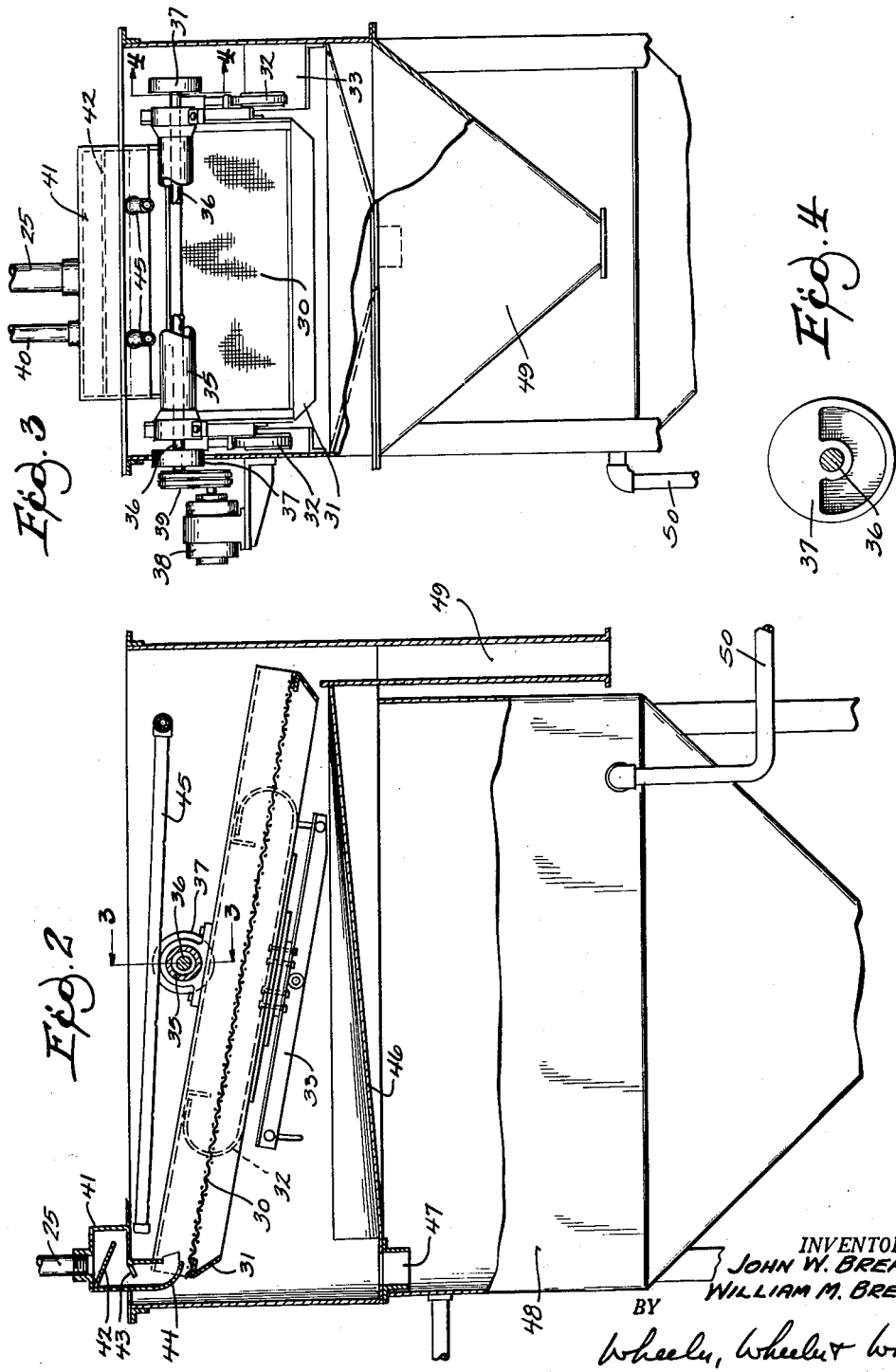

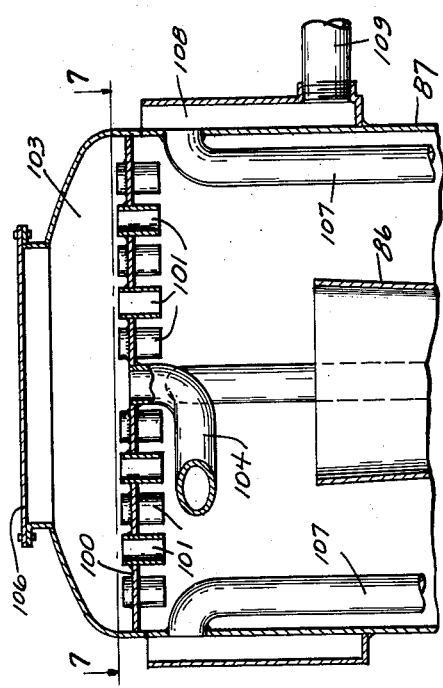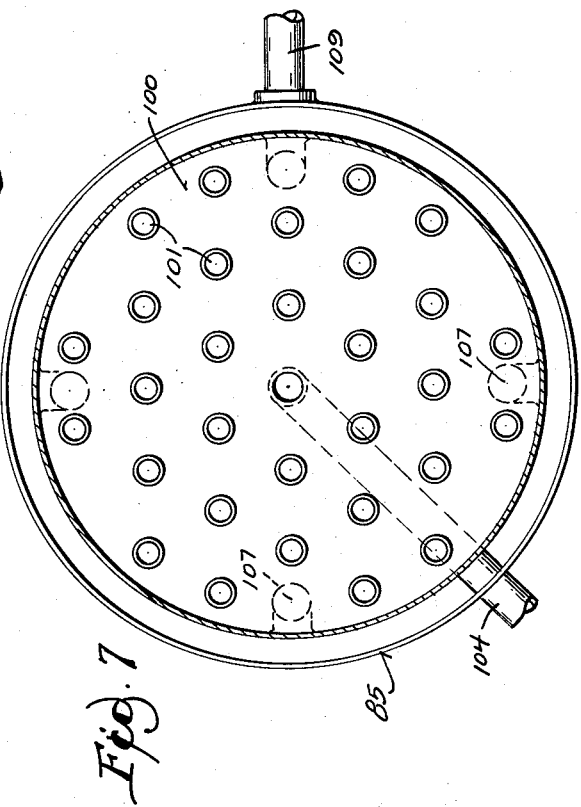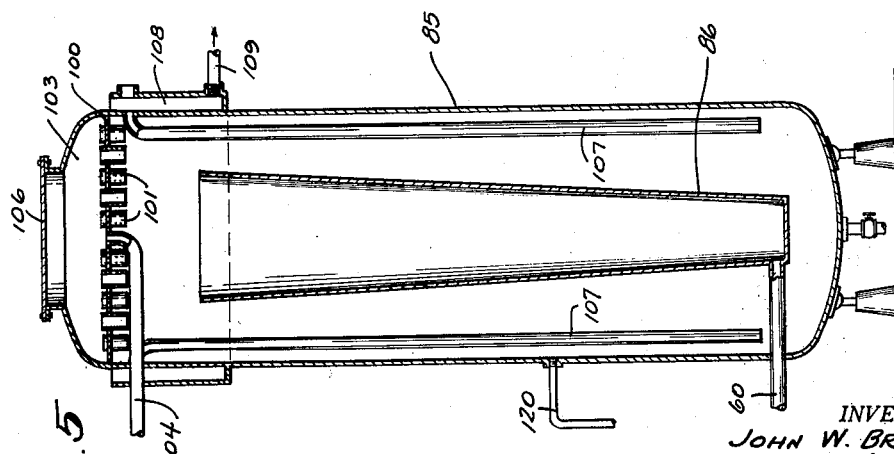

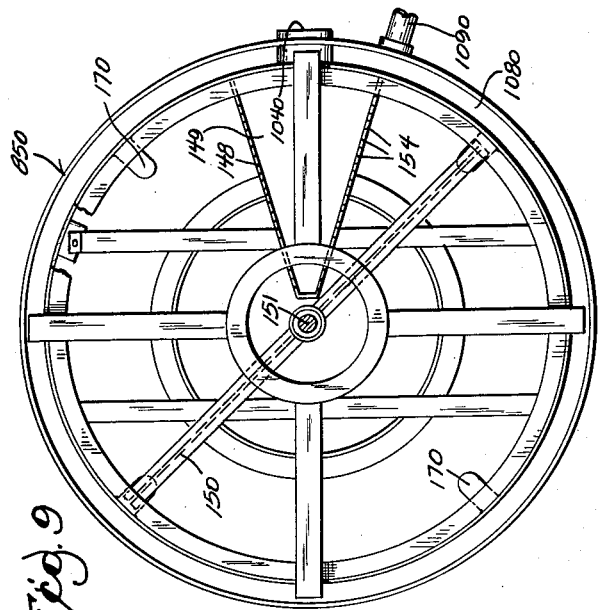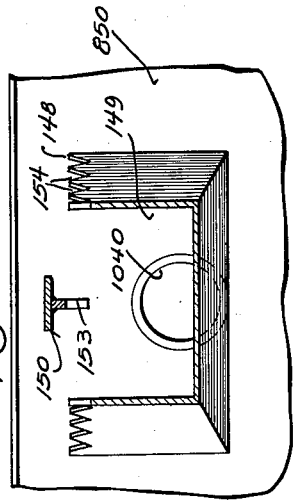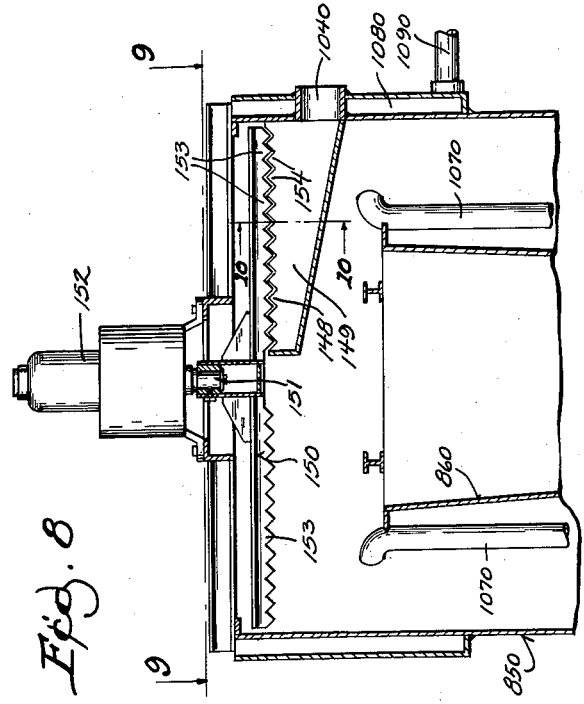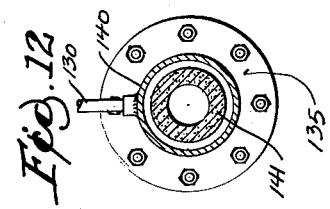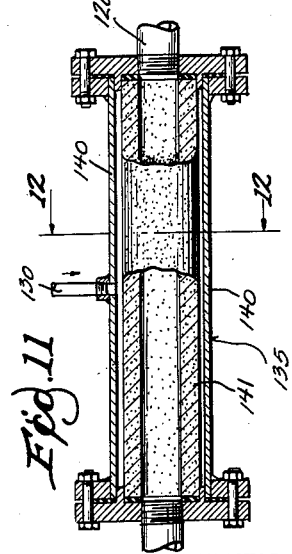

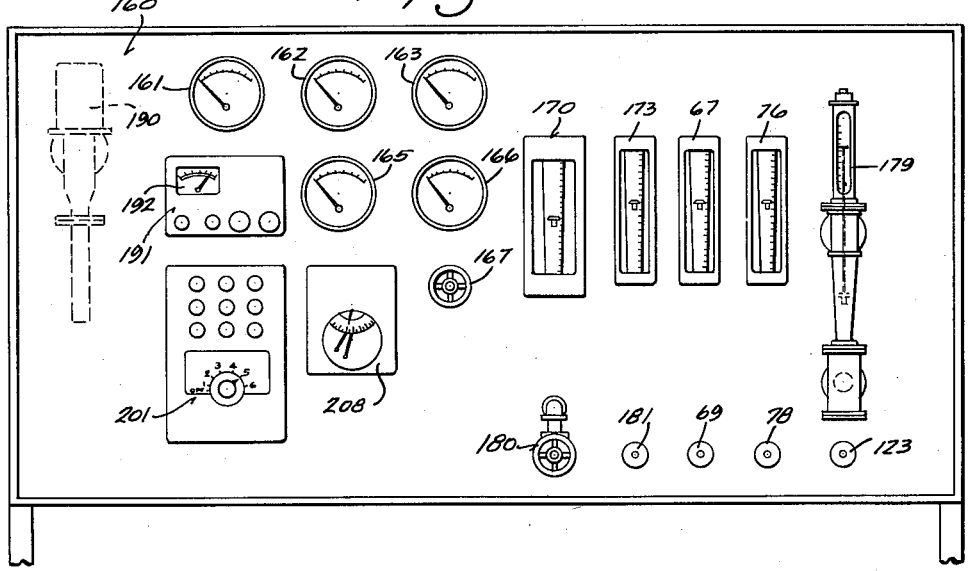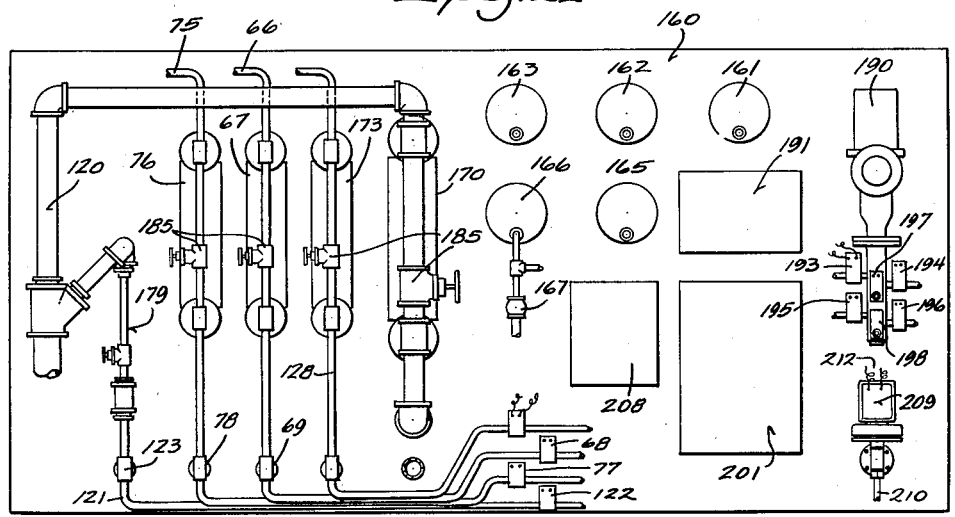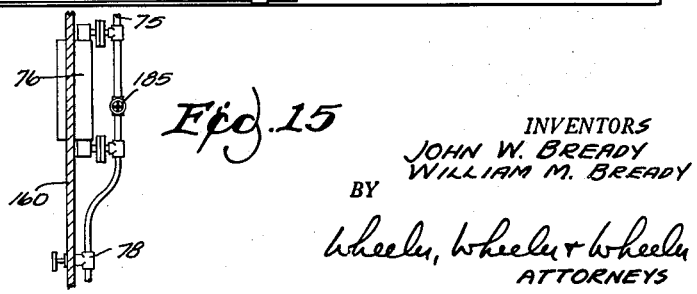

This invention relates to a system for the rectification and clarification of waste water. While the invention has generic aspects, it is particularly applicable to treatment of polluted industrial wastes, not only for enabling such water to be reused, but for the purpose of salvaging heat which is in the water at the time of its release from previous usage, as well as to deliver a clear and final end product-effluent rectified as to:

(1) Total suspended solids
(2) Biochemical oxygen demand
(3) Oils and greases in suspension or emulsion
(4) Bacterial neutralization
(5) Sedimentation and removal of metallic residue
(6) Heat retention
(7) Conversion of such waste effluent to a clear re-usable industrial soft water.
(8) Total pollution correction of any and all industrial waste waters to qualify such effluent to conform to existing codes prepared by authorities.

Not only has economy of water and fuel as provided for in this system become a necessity but the present invention achieves very significant gains in the simplification of problems involved in pollution control and disposal of such wastes because treatment can be varied to match various pollution reduction demands to specification demands ranging from partial correction to that of conversion to a re-usable, clear effluent.

Without limitation, and solely by way of illustration, except as hereinafter noted, the invention will be exemplified for the purpose of this disclosure in a device and method for treating, recirculating, clarifying, and re-using laundry waste water and the heat therein.

Whatever the source, water used for industrial purposes has to pass certain requirements as to bacteriological specifications and health department requirements. In the course of industrial use, this water becomes polluted. In the case of laundries, textile mills, etc., it may also acquire heat. Some of the factors involved are listed above.

The waste water is collected for treatment in a pit which serves as an accumulator. Waste water dumpage is frequently intermittent and irregular and in large volume, whereas the system herein disclosed operates to the best advantage at a predetermined fixed rate of flow per minute. While it is desirable to have this flow continuous at a rate representing the average of total plant requirements, this is not always practical. Accordingly, the fixed rate of flow may be interrupted periodically when supply exceeds demand. From the pit, the polluted waste water is picked up by a non-clogging, self-priming pump and delivered across a specially designed vibratory screen which removes all of the larger foreign matter and passes only such fine entrained materials as can be handled in the remainder of the system. The mesh of the screen is determined by the character of the waste. The more organic matter which is mechanically removed, the greater will be the benefit derived from a given chemical treatment which follows. Use of screening to reduce oxygen demand is believed to be new.

In preparation for the ensuing treatment, a colloidal substance such as anhydrous meta-silicate or bentonite clay is desirably added to assist in the ultimate removal of oils, greases and subsequent emuslification and flocculation.

The initial pH is now determined and the regulation of flow at a predetermined rate facilitates the accuracy of the treatments in accordance with the determined pH. As a further means of facilitating uniformity of treatment, the water is passed through a tempering heater subject to accurate thermostatic control, desirably within one degree plus or minus. The flow rate should also be extremely accurate within limits, desirably, of plus or minus five gallons per minute. Both temperature and rate of flow are desirably maintained constant with great accuracy to establish the basis for correct chemical reaction.

The pH is now progressively varied to render the water acid. In the course of chemical treatment progression, sulfuric acid of the desired concentration is injected into a manifold through which the water is flowing, the rate of injection being accurately related to water flow. Provision is made for checking the gauge at this point. The acidification of the variable waste received into the system is desirably controlled automatically to make the waste uniform as to pH at this point so that subsequent chemical treatment will be uniform.

After establishing the preliminary acidification by sulfuric acid, acidification to the desired value is completed by the addition of aluminum sulfate. On very light pollution, it is possible to use aluminum sulfate without the acid. In such cases, the acid rather than the sulfate is dispensed with, as the aluminum sulfate is desired for the subsequent flocculation step. However, the acid is cheaper and is therefore used for reasons of economy if the entering waste is materially above 7.0 pH.

Meantime a component of previously clarified water has sodium hydroxide added to it in quantities sufficient to render it slightly alkalized. In addition, this water is aerated by diffusion with minute bubbles of air subdivided in passing through a porous ceramic wall to which the flowing stream of such water is exposed. The aerated water, slightly alkalized, is then mixed with the main flow of acidified water and, with the resulting chemical action in progress, the two components are delivered together into a flotation tank. The resulting floc, forming in the tank, is firmly attached to air bubbles and continues to grow with resulting involvement of waste material. The floc rises to the surface of the tank, forming a foamy sludge, which is removed either by vacuum or skimming as hereinafter described. From a point below the level of the sludge, the clear water is removed, still containing substantially all of its original heat, and returned for re-use, being additionally heated if required. The sludge returns to the screen, where it actually assists in the further screening of newly arrived waste and also returns any chemicals to the water. The washed sludge and solids removed from the newly arrived waste are then withdrawn for burning or other disposal.

The treated water is now clear, soft, substantially completely free of solids, has no oxygen deficiency, is free of oils and greases, has established alkalinity at any desired value (such as 7.2 pH), has substantially the temperature at which it enters the system and is substantially free of bacteria, showing 0.0 count on those bacteria which are objectionable under the codes.

Since flow is normally rapid and the apparatus is much more compact than may appear in this diagrammatic showing, the water loses no substantial heat during treatment.

Since solids are delivered from the screening operation in a relatively water-free condition, these may be burned. This is a valuable salvage feature and actually contributes to the industrial operation since laundry waste (for example), includes the oils with which clothing and cleaning cloths used in factories are frequently quite heavily saturated. Thus these combustibles are salvaged, as well as the water and the heat of the water, and excessive demands upon the sewerage system are eliminated.

In the drawings:

FIG. 1 is a diagrammatic view of an entire recirculation system embodying the invention.

FIG. 2 is a view partially in side elevation and partially in longitudinal section showing a special screen from which all solids are discharged.

FIG. 3 is a view partially in end elevation and partially in cross section on the line 3—3 of FIG. 2.

FIG. 4 is a diagramamtic view on an enlarged scale taken on the section 4—4 of FIG. 3.

FIG. 5 is a view in axial section through a preferred construction of a sludge separation, flotation and coagulation tank.

FIG. 6 is an enlarged fragmentary detail view of the upper portion of the tank in axial section.

FIG. 7 is a view taken in horizontal section on the line 7—7 of FIG. 6.

FIG. 8 is a fragmentary detail view showing the upper portion of a modified sludge separation, flotation and coagulation tank assembly as it appears in axial section.

FIG. 9 is a view taken on the line 9—9 of FIG. 8.

FIG. 10 is a view taken in section on the line 10—10 of FIG. 8.

FIG. 11 is a view in section through a ceramic air infusing device, portions of the ceramic filter being shown in side elevation.

FIG. 12 is a view taken in section on line 12—12 of FIG. 11.

FIG. 13 is a view in front elevation of a control panel and the instruments mounted thereon.

FIG. 14 is a view of the control panel and the instruments in rear elevation.

FIG. 15 is a view in side elevation of the flow meter.

FIG. 16 is a fragmentary detail view in section on an enlarged scale showing one of the aspirating connections for chemical introduction into the circulating water.

As already indicated, the laundry system selected to exemplify the invention involves an arrangement for recirculating laundry water to salvage both the water and substantially all of its original heat, the water being subjected to physical and chemical treatments in the course of its recirculation to purify it, soften it and remove all solids and other impurities, whereby substantially the only heat or water which must be added is that lost during the actual laundering operation.

For the purpose of explaining that no water or heat is lost through the reclamation process as such, it will be noted that, in the ordinary laundering operation, water at 180° is used for washing and rinsing. Then, before the laundry is withdrawn from the washer, its temperature is deliberately reduced to about 100° by addition of cool water to facilitate unloading. The water discharged to the pit for reclamation is therefore more than the volume of hot water which will be required or can be accommodated in the washer for washing and rinsing in the next cycle. Thus a part of the reclaimed water is invariably required to be discharged to make room for these additions which the laundry employs for cooling purposes. This discharged water has already had its impurities removed and is acceptable for sewage disposal. Such heat as is lost from the system over and beyond the very minimum radiation losses is carried off in this discharge water.

In FIG. 1, a washer is diagrammatically represented at 20. The effluent is discharged through pipe 21 into the usual sump or floor pit 22 which here acts only as an accumulator, since the circulating pump 24 is desirably in continuous operation to draw the water and all of its content of foreign matter through the suction pipe 23 from the bottom of the pit 22 and to deliver it through pipe 25 to the screen separately illustrated in FIGS. 2 to 4.

A vibrating screen 30 is preferably employed. This screen is mounted on a subframe 31 which is suspended in an inclined position by means of springs 32 from a mounting bracket 33. Spanning the subframe is a tube 35 within which bearings support a shaft 36 which carries eccentric weights 37 (FIG. 4) and is driven from motor 38 by belt 39. The weights cause the shaft 36 to vibrate and vibration is thereby imparted to the screen.

It will be apparent that the smaller the particle size of organic matter remaining in the effluent, the less chemical will be required for subsequent treatment. Ultimately it is sought to use a screen of approximately 100 mesh to screen out of the effluent all particles larger than .005. In practice, physical dimensions of the screen with which experimentation is in progress have required the use of a 60 mesh screen to remove particles larger than .012. There are, however, effluents which require no screening whatever.

In practice it is desired that the screen be maintained in continuous operation even in such installations as may require periodic shut-downs of chemical treatment due to an excess of supply over demand. During such continuous operation of flow is from the pit over the screen and from the balance tank 48 below the screen the effluent overflows back into the pit.

The dirty waste water delivered to the screen by means of pipe 25, together with the coagulant returned to the screen through pipe 40, enters a flume 41 in which a series of baffles 42, 43, 44 distribute the water and solids across the full width of the screen 30. The screen is washed by water supplied through the jet spray system 45. The relatively clear water passes through the screen onto the pan 46 which drains through outlet 47 into tank 48. The solids are discharged over the end of the screen to the waste discharge 49 from which they may be collected in any desired manner for burning or other disposal. Since the solids contain oil and grease and other combustibles, it is economical to burn them, leaving only a relatively small incombustible residue.

The relatively clear water is withdrawn from tank 48 through the line 50 which leads to a pump 51. The discharge pipe 52 from this pump leads through a control manifold 53 from which samples are withdrawn at 54 for pH check. The flow (while not necessarily continuous, as above noted) is regulated to remain at a constant rate per minute, this being done by means of an orifice type flow meter at 55 of known design, which is used to control a flow valve 56. A heater 57 receives steam through pipe 58 and exhausts condensate through pipe 59. Heater 57 will be used only if necessary and to add just enough heat to assure uniform water temperatures to regularize the chemical reactions presently to be described.

The water at regulated temperature passes from the heater 57 through a pipe 60, where it is acidified. Sulfuric acid is the initially preferred acidfying agent. This passes from the tank 65 through pipe 66 in which there is a flow meter at 67, an electro-magnetic or fluid operated valve at 68 and a needle valve at 69. The pipe 66 opens into pipe 60 through an aspirating terminal 70 as shown in FIG. 16, this being typical of other aspirating fittings used where relatively low flow is required. In a test installation in which water flow is 12,000 gallons per hour or 200 gallons per minute, the flow of acid from tank 65 through pipe 66 is about .04 to .08 gallon per minute.

In a manner hereinafter to be described, a sample of acidified water is withdrawn through pipe 72 for pH control. The withdrawn sample automatically controls additional acidification as required to establish an accurately fixed pH. This time aluminum sulfate is desirably used as an acidifying and coagulating agent. The aluminum sulfate is stored in tank 73 wherein it is constantly recirculated by pump 74. As required, a part of the recirculating solution is withdrawn through pipe 75 and flow meter 76 and electromagnetic valve 77 and needle valve 78 to enter the water in pipe 60 through an aspirating nozzle of the type shown at 70 in FIG.

16 and already described. Provision is made for a further check of pH at 79.

A relatively large volume of already clarified water (approximately 20 gallons per minute in relation to a total flow of 200 gallons per minute) is then withdrawn from tank 85 through pipe 120 and alkalized and aerated as hereinafter described. This alkaline solution is then introduced into pipe 60 through the angle fitting 80, which likewise has an aspirating effect. The aspirating arrangement is somewhat different because of the larger volume requirement, about twenty gallons per minute being handled through fitting 80 from the pipe 81 which leads from pump 82. Provision is made at 83 for a further check of acidity and the pipe 60 continues to the clarifier and reactor tank 85 wherein sludge separation, flotation and coagulation occur. It will be understood that where detail is not required the pipes are shown as if reduced in diameter in the diagrammatic showing of FIG. 1. In actual practice, the diameter of a given pipe will usually be uniform.

Within the tank 85 there is a cone 86. In the embodiment shown in FIGS. 1, 5 and 6, the water which has been aerated and adjusted as to pH is delivered into the bottom of the cone as best shown in FIG. 5 and rises in the cone, overflowing the top of the cone into the water which fills the tank 85. In this tank, gravity separation occurs as coagulation develops. The mineral impurities in the water tend to coagulate on the air bubbles and thereby to be floated to the surface.

Because of the air content of the water, supplied by means hereinafter to be described, the floc rises in tank 85 separating by flotation from the clarified water. Substantially all physical impurities are trapped in the coagulant or floc, leaving the water in tank 85 substantially completely clean and pure.

The floc is preferably removed by a vacuum head. A baffle plate or partition 100 spans the tank 85 immediately above water level therein and is provided with a number of short lengths of tubing at 101. In practice, the partition plate or baffle 100 is ported by the provision of tubes three inches in diameter which extend through the plate at a determined level. From the chamber 103 in the top of tank 85 leads a discharge pipe 104 connected with the vacuum sludge pump 105. This pump maintains a slight vacuum in the top of the tank which is sufficient to draw through the pipes 101 the sludge or floc accumulating on the surface of the water. The vacuum has amounted in practice to about four inches of mercury. Variation in vacuum will determine the quality of the sludge. The greater the vacuum, the greater the density of the sludge due to increased evaporation. The pump 105 returns all of the foam, floc or sludge, along with air and water vapor, through the pipe 40 to the flume 41 of the screen chamber shown in FIGS. 2 and 3. A manhole 106 provides access and facilitates inspection and cleaning out the top of tank 85 above the baffle 100 when required.

Clarified water from which the coagulant has been separated by flotation in tank 85 is withdrawn through the four uptake pipes 107 to an annular storage ring 108 which opens to the atmosphere and from which pipe 109 leads to pump 110. In pipe 109 there is desirably means for final pH check at 111. That portion of the purified water which is to be used in another washing cycle, still containing substantially all the heat which it had when received from the washer, is now reheated by standard laundry heating equipment, such as heater 112. It may be stored in an accumulator 113 until needed, valves at 114 and 115 providing for appropriate control of delivery. The unneeded portion (possibly 20%) will be discharged.

A portion of the pure water in tank 85 is withdrawn through a pipe 120 to be alkalized and aerated and recirculated. The pipe 120 receives an injection of alkalizing agent through pipe 121 subject to control of automatic valve at 122 and a manually operated valve at 123.

Sodium hydroxide is the preferred chemical. The sodium hydroxide is stored in tank 124. The nature of the industrial waste will determine the rate and mode of feeding. In test apparatus both the acid and alkali tanks 65 and 124 are desirably subject to air pressure supplied through line 125 and branch lines 126 and 127.

Another branch air supply line 128 leads through air regulator 129 to a pair of aerating fittings 135 which are identical and used alternatively and to which air may be delivered selectively through individual valves at 136 and 137. Each aerating device comprises a tubular casing 140 (FIGS. 11 and 12) within which there is a porous ceramic tube 141. Subject to the control of the valves shown at 142, 143, 144 and 145, the alkalized water taken from tank 85 may be passed to the circulating pump 82 through either aerating device, to traverse the porous ceramic tube 141 longitudinally and to receive air which enters the water through the pores of the tube 141, the air being delivered under pressure from one of the branch pipes 130 into the space between the jacket 140 and the ceramic tube.

Provision is made for bypassing this aerated alkalized water through a line 147 back to pipe 52 but the valve 148 controlling bypass line 147 is normally closed and the aerated and alkalized water normally flows through pipe 81 and injector 80 into conduit 60 where it is commingled with the acidified component as already described.

The chemical reaction is in progress and gas and air bubbles are being formed at the time the commingled acidified and alkalized components are delivered into the tank 85 for flocculation, flotation and separation as above described.

The sludge separation and flotation coagulation tank 850 shown in FIGS. 8 to 10 is alternatively usable in place of the preferred tank 85 illustrated in FIGS. 5 and 7. In tank 850, the conical baffle 860 corresponds to baffle 86 in receiving the aerated and chemically mixed components of water. The pipes 1070 lead from a point near the bottom of the tank 850 upwardly and outwardly into the annular manifold 1080.

Just above water level in the tank 850 is the margin 148 of trough 149, which has a discharge pipe 1040 serving to return the sludge to the screen, corresponding to the pipe 104 in FIGS. 6 and 7.

In order to sweep the floc or sludge from the surface of the water into the collecting trough 149, a rotary sweep or paddle 150 is used, this being mounted on shaft 151 to be driven by motor 152. Desirably, the sweep 150 and the trough margin 148 are serrated to provide complementary teeth 153, 154 as best appears in FIG. 8. The rotating sweep continuously discharges all floating scum, floc, sludge or coagulant from the surface of the water into the trough 149 while, from a lower level, the clarified water is constantly being discharged through the annular manifold 1080 and the pipe 1090, it being understood that a portion of the clarified water will desirably be alkalized and aerated and returned for admixture with the acidified component in the manner already described.

While the manner in which the chemicals are controlled and the pH tests are run is broadly immaterial to the invention, a preferred panel arrangement is shown in FIGS. 13 to 15, which shows the actual mounting of the instruments which, in the diagrammatic showing of FIG. 1, are correlated with the several parts of the system to which they relate.

The instruments mounted on the face of panel 160 include thermometer 161 connected to show the temperature of the water derived through pipe 52 from the accumulating tank 48; a pressure gauge 162 connected to show the pressure at which the water is discharged from the main feed pump 51; a pressure gauge 163 connected to show the pressure in main feed line 60; a flow meter 165 which shows the actual flow occurring in the system as a whole; a pre-set flow control device 166 for regulating total continuous flow through valve 56 as determined by its valve 167; a flow meter 170 in the water supply line pipe 120 which leads to the aeration diffusers 135; an air flow meter 173 in the air line 128; a sulfuric acid flow meter 67 in the pipe 66; an aluminum sulfate flow meter 76 in the pipe 75 and a hydroxide flow meter 179 in the pipe 121. The needle valves 180 for water; 181 for air; 69 for acid; 78 for aluminum sulfate; and 123 for hydroxide are located immediately beneath the respective flow meters to facilitate accurate regulation of flow to the desired values.

FIG. 15 shows a typical flow meter installation in side elevation, there being a valve-controlled bypass 185 preferably connected across each flow meter as shown.

The pH meter 190 is located behind the panel as shown in dotted lines at the left in FIG. 13 and in full lines at the right in FIG. 14. It is a device of conventional type in which the reading is electrically amplified in the amplifier 191 and shown by the pointer 192 on the face of the panel. The testing of pH at any desired point in the system is accomplished with a single meter by means of solenoid valves 193, 194, 195, 196, 197 and 198 assembled with the meter at the back of the panel as shown in FIG. 14 and controlled by the rotary selector switch 201 for establishing flow through the meter from the corresponding check points at 54, 72, 79, 83, 111, 207, etc. 208 is a recording instrument and 209 is a vaporstat, these instruments being particularly valuable in an experimental panel installation. All of the instruments mentioned will be useful in practice but none of them is required, particularly in the case of batch operation. In the preferred organization shown, automatic regulation of total flow per minute and relative flow per minute of the individual ingredients becomes very desirable for best results. The system is designed to achieve automatic regulation on the basis of gal./min. flow. The selected volume per hour is obtained by the number of minutes per hour that the system operates.

The operation may be summarized as follows:

In the preferred functioning of the apparatus, the cycling of the water is continuous (in gallons per minute), the discharge from the washer being accumulated in the sump 22 from which water is withdrawn to pass at a constant rate through the treatment process, returning free of impurities but still containing substantially its original heat of washer discharge to flow into the hot water storage tank 113 of the plant hot water system until the washer finishes a current load and is ready to be refilled.

Physical impurities which can be strained from the water are removed in the vibrating screen apparatus 30 leaving the water largely clear of physical impurities when it is discharged into the tank 48 and receives the emulsifying or coagulating reagent which is added to facilitate sludge formation. Thence the water is withdrawn, acidified and mixed with a returning component of alkalized and aerated water from the clarifier and reactor tank, and the two mixed components of acidified and alkalized water in which chemical reaction is in process are then delivered to the clarifier-reactor tank where flocculation occurs and the trapped air bubbles carry the floc and impurities entrained therewith to the surface of the clarifier-reactor tank to be removed either by vacuum or by the mechanical sweeps and returned to the screen 30. In the clarifier-reactor tank, the water from which the floc rises is clear, pure and soft. It is a component of this purified water which is withdrawn and alkalized and aerated and returned to the incoming water to be mixed therewith to facilitate flocculation. The major part of the purified water from which the floc rises in the clarifier-reactor tank is returned to the laundry for re-use.

In the past, the only known commercially practicable way of salvaging the heat in water discharged from a laundry machine has been through interchange with make-up water, the water from the washer being thrown away. The concept of salvaging the heat as well as the water by recycling through a clarifying and purifying treatment is believed to be new. It makes tremendous savings possible not alone in the cost of the water and the cost of the heat, but in the eliminated or reduced softening expense; the eliminated or reduced sewage tax; the eliminated or reduced heat exchange apparatus cost; the eliminated or reduced stoppages due to foreign matter; and the eliminated or reduced loss of oils, greases and combustible solids which are salvaged in this process for use.

What is claimed is:

1. The combination with a washer designed for batch operation using hot water, of a sump into which the washer discharges, a water clarifying system having an inlet connection from said sump and comprising means for the physical and chemical clarification of said water while retaining substantially all heat, means for effecting flow of said water through said system on a gallon per minute basis to accommodate the hourly demand, and an accumulator to which said system delivers the water following clarification, said first means including a vibrating screen; a collector to receive water passing the screen; a sludge tank; means for acidifying and alkalizing separate portions of the water, mixing such components together and delivering said portions into the sludge tank; means for returning sludge from the tank to said screen; and means for returning clarified water from the tank to the acumuator.

2. The device of claim 1 including means for aerating at least one of said portions.

3. The device of claim 2 in which one of said portions comprises water withdrawn from the sludge tank and returned thereto after admixture with the other portion.

4. The device of claim 2 in which the aerating means comprises a porous ceramic tube, means for passing therethrough the portion of water to be aerated, and means for supplying air under pressure about the exterior of said tube to pass through the pores thereof into the water traversing the tube.

5. The device of claim 2 in which the means for aerating the portion comprises a pair of chambers having a common porous wall, the water portion to be aerated being on one side of said wall and the other side of the wall being exposed to air, and means for creating a pressure differential whereby the air is at a higher pressure at one side of the wall than is the water portion at the other.

6. A water clarification system comprising the combination with means for mixing portions of water, means for acidifying one of said portions prior to mixing them, means for alkalizing another portion prior to mixing them, means for delivering a powdered inert material into one of said portions prior to mixing them, and a clarifier-reactor tank having connections for receiving the mixed portions, said tank having means for establishing a predetermined water level therein, and means for removing sludge from the surface of water at said level and means for discharging, from below said surface, clarified water from which the sludge has been removed.

7. The device of claim 6 in which the sludge removing means comprises a vacuum head including a ported partition in said tank substantially at said level and sludge withdrawing means comprising a pump adapted to draw a partial vacuum above said partition whereby sludge is drawn through the ports of the partition and discharged.

8. The device of claim 7 in which the partition is provided with a multiplicity of tubes substantially normal to the water level and extending through the partition to constitute the ports therein, the pump means for establishing a partial vacuum above the partition tending to raise the water level of said tank to the lower ends of said tubes.

9. A device of the character described comprising the combination with an inclined vibratory screen, of means for discharging across said screen water containing mechanical impurities, the screen straining such impurities from the water, means for chemical treatment of the water which passes the screen to develop a floc therein, a clarifier-reactor tank connected to receive the water pending floc development, means for separating the sludge from the water in said tank, and means for returning the sludge to said screen in the path of water freshly supplied to said screen whereby the sludge is washed by newly received impure water, and whereby the sludge is discharged from the screen along with mechanical impurities separated by the screen from the incoming water.

10. The device of claim 9 including means for withdrawing water from the tank and remixing it with water which has just passed the screen, and means for treating the separate portions of water from the screen and the tank with reacting chemicals prior to admixture.

11. In a device of the character described, the combination with a vibrating screen and means for pumping onto the screen water containing mechanical or organic impurities to be screened from the water, the screen having a discharge connection at one end for said impurities and it being provided with a balance tank for water which passes through the screen, means for testing the acidity of the water of said tank, means for adding acid to water from the tank, means for alkalizing a separate water portion and for admixing the acidified water and the alkalized water, a clarifier-reactor tank having a connection to receive the mixed alkalized and acidified portions of water, means for withdrawing sludge from the surface of water in the clarifier-reactor tank, and means for withdrawing water from below the surface of water in the clarifier-reactor tank.

12. The combination set forth in claim 11 in further combination with means for returning a portion of the water from the clarifier-reactor tank as one of said portions.

13. The combination set forth in claim 11 in further combination with means for returning to said screen in the path of water newly supplied to the screen the sludge removed from the surface of the clarifier-reactor tank, whereby said sludge will be discharged from the screen along with mechanical or organic impurities separated from the water newly supplied.

14. A clarifier-reactor tank comprising the combination with a tank having water inlet and outlet connections and means for establishing a normal water level therein, of a vacuum head comprising a transverse partition immediately above normal water level at atmospheric pressure and provided with ports and means for evacuating the portion of the tank above said partition whereby to create in the tank a partial vacuum adapted to raise the level of water in the tank above said normal water level sufficiently to elevate through said ports sludge on the surface of the water, whereby said sludge can be withdrawn by said evacuating means.

15. The device of claim 14 in which said partition is provided with depending tubes at each of said ports, said tubes extending substantially to said normal water level.

16. A method of salvaging water and combustible portions of water containing oil and oxidizable fibers, said method consisting in separating physically removable waste including such fibers from the water by passing the waste over a screen through which the water flows, discharging such waste from the screen, collecting the laundry water which flows through the screen and acidifying such water, alkalizing and aerating a previously clarified portion of the water, mixing the alkaline water with the acidified water and delivering the mixture into a clarifier-reactor tank for chemical reaction and flocculation, the air in the water developing bubbles causing the floc to rise to the surface in said tank, the floc including entrained oils, withdrawing the floc from the surface of the water and mixing it with waste collected by said screen.

17. The method of claim 16 including the step of salvaging heat in said water by conducting the said steps with sufficient continuity and rapidity to complete said steps while the water contains most of its original heat.

18. The method recited in claim 16 including the step of spraying water over the screen whereby to wash the screen, the water passing through the screen being commingled with the water with which the solids are being delivered to the screen.

19. The method recited in claim 16 which includes the step of returning to the screen the floc withdrawn from said clarifier-reactor tank to be discharged from the screen with the solids initially separated from the water.

20. The method recited in claim 16 in which a portion of water withdrawn from the clarifier-reactor tank below the surface of floc therein is alkalized and aerated and constitutes the alkaline water mixed with the acidified water.

References Cited by the Examiner

UNITED STATES PATENTS

| 1,176,428 | 3/16 | Callow | 210—221 X |
|---|---|---|---|
| 1,426,596 | 8/22 | Peck | 210—44 X |
| 1,430,182 | 9/22 | Peck | 210—44 |
| 1,567,033 | 12/25 | Caps | 210—305 X |
| 2,360,812 | 10/44 | Kelly et al. | 210—13 |
| 2,440,514 | 4/48 | Karlstrom | 210—44 |
| 2,478,703 | 8/49 | Moore | 210—83 X |
| 2,695,710 | 11/54 | Gibbs | 210—221 X |
| 2,759,607 | 8/56 | Boyd et al. | 210—44 |
| 2,762,681 | 9/56 | Crowley | 210—42 X |
| 2,793,185 | 5/57 | Albrektsson et al. | 210—44 |
| 2,799,396 | 7/57 | Belaskas | 210—221 |

FOREIGN PATENTS

| 622,495 | 5/49 | Great Britain. |
|---|---|---|
| 752,099 | 7/56 | Great Britain. |

OTHER REFERENCES

"Vacuum Flotation," Fischer, Engineering News-Record, Feb. 25, 1943, 5 pages.

MORRIS O. WOLK, *Primary Examiner.*

CARL F. KRAFT, EARL M. BERGERT, *Examiners.*